Sept. 25, 1973 J. M. MROZEK ET AL 3,761,344
ALIGNMENT DEVICE FOR INDIVIDUAL LABELS
Filed Sept. 28, 1971 2 Sheets-Sheet 1
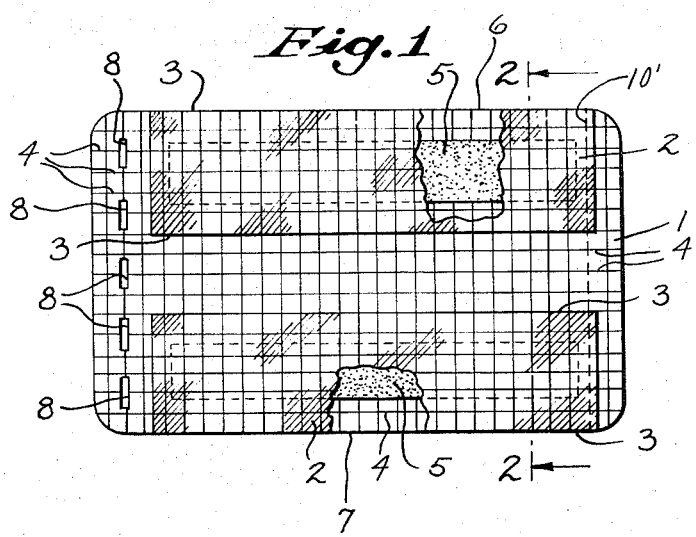
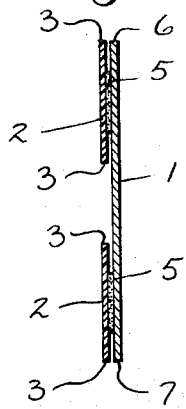
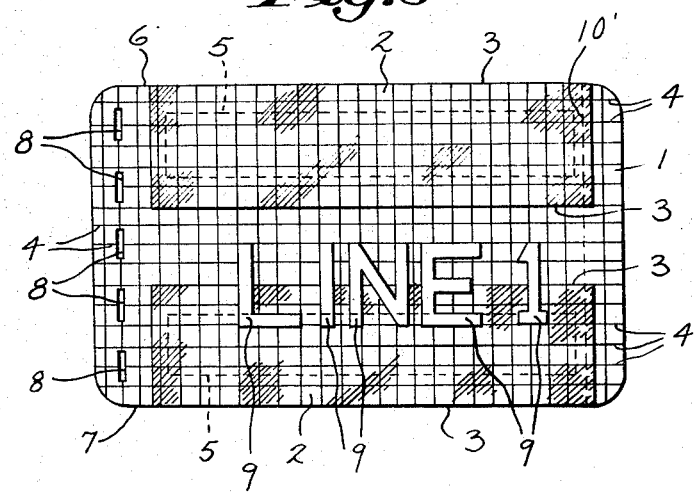
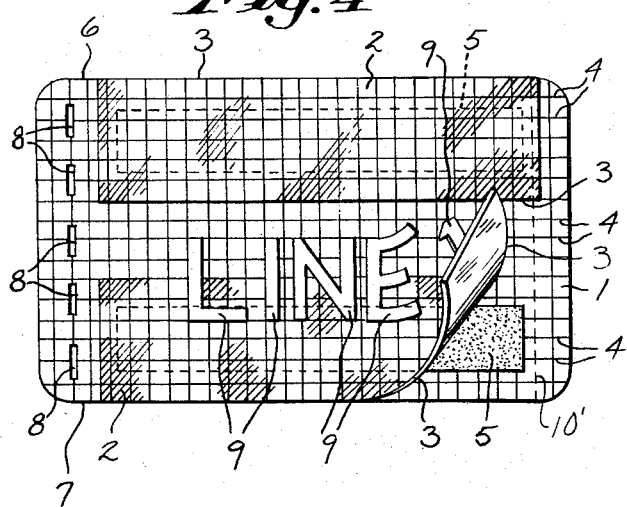
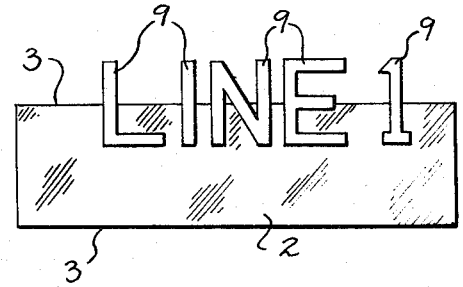
INVENTORS
JAMES M. MROZEK
ELLIOTT G. HEUSER
BY
ATTORNEY Sept. 25, 1973   J. M. MROZEK ET AL   3,761,344
ALIGNMENT DEVICE FOR INDIVIDUAL LABELS
Filed Sept. 28, 1971   2 Sheets-Sheet 2
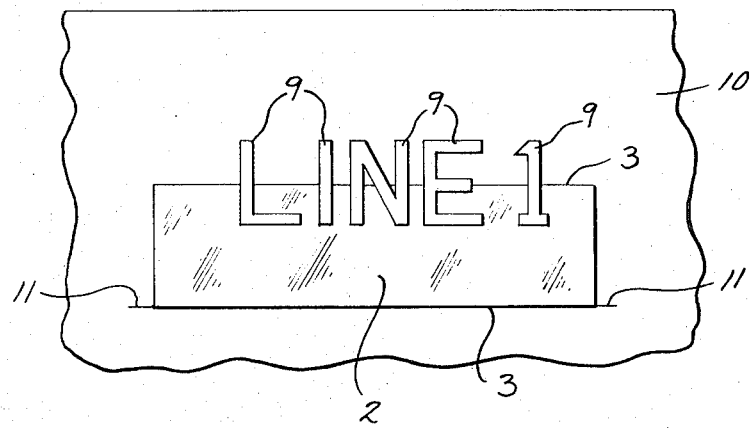
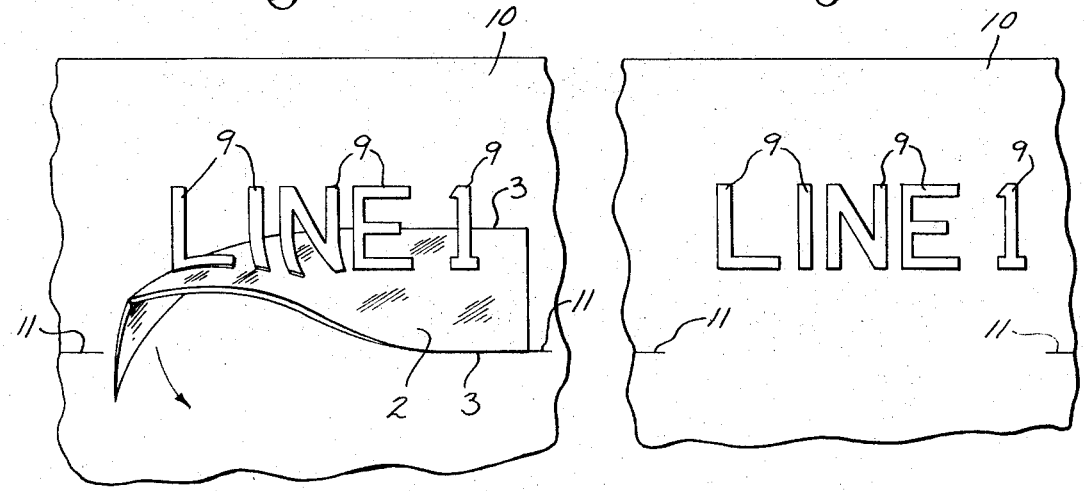
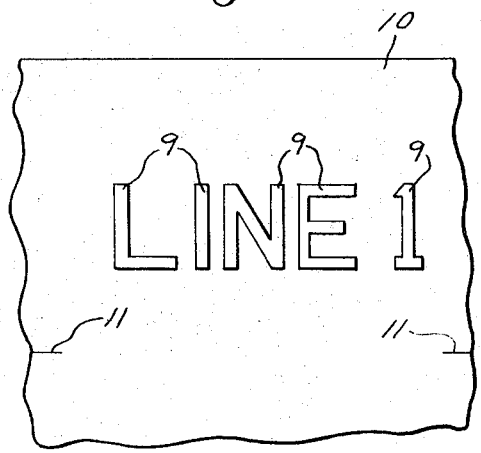
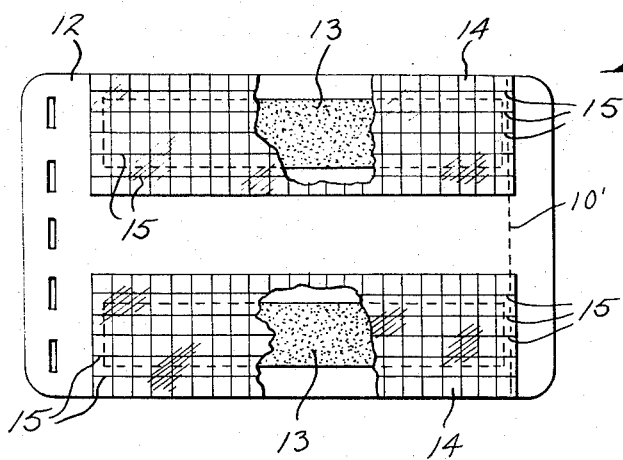
INVENTORS
JAMES M. MROZEK
ELLIOTT G. HEUSER
BY
ATTORNEY

United States Patent Office 3,761,344
Patented Sept. 25, 1973

3,761,344
ALIGNMENT DEVICE FOR INDIVIDUAL LABELS
James M. Mrozek, Milwaukee, and Elliott G. Heuser, Mequon, Wis., assignors to W. H. Brady Co., Milwaukee, Wis.
Filed Sept. 28, 1971, Ser. No. 184,389
Int. Cl. B32b 3/06, 7/06; B44c 1/24
U.S. Cl. 161—39
7 Claims

ABSTRACT OF THE DISCLOSURE

A reusable alignment device and method for aligning a group of individual adhesive labels and applying them to an object in their aligned condition. The alignment device includes a transparent transfer strip that is releasably carried on a backing card. The selected labels are positioned in aligned relationship on the transfer strip and the strip is then removed from the backing card to serve as means for transferring the aligned labels to the object to be labeled.

BACKGROUND OF THE INVENTION

Field of the invention

The present invention relates to a reusable means and application of individual adhesive labels onto an object.

Description of the prior art

Individual adhesively backed labels have proved to be extremely useful for a multitude of purposes due to their easy storage and facile application. Nevertheless, in the past there has been no easy and quick procedure for applying the labels onto an object to be labeled in proper alignment or evenly spaced. The users of such transfers have been left to their own resources to devise methods of alignment that would best work for them. The primary method of alignment that has evolved for such transfers is to draw gridlines on the object to which the transfers are to be affixed to provide for proper spacing and alignment, but there are a number of problems associated with this method. It is often difficult to draw lines on the particular object to be labeled, and in other instances when it is easy to be gridlined, a problem arises in that the gridlines may not be easily removed after the labels are applied. Moreover, even without these problems, precise and accurate measuring must be performed to correctly mark the gridlines on the object to be labeled.

Problems arise when the labels are applied to an object without the use of any guidelines, such as that the words or numbers formed by the individual labels may be misaligned and off-center from their desired position.

Certain methods have been developed in the decalcomania art for applying individual transfers to an object by the use of a separate backing sheet for each individual decal, with each decal prepositioned on its backing sheet by the manufacturer. Examples of such constructions are shown in U.S. Pats. 3,297,507, 3,094,451, and 3,294,611. A commercially used construction for the alignment of individual pressure sensitive labels is shown in U.S. Pat. 3,315,387 wherein the backing for each label includes structural alignment means for arranging a group of such labels into a selected legend. The present invention, however, is designed for use with a plurality of labels carried on a single storage card and there are no guidelines on the storage card nor is it cut to a specific size or configuratino to enable the storage card to be utilized in the alignment of the labels.

SUMMARY OF THE INVENTION

The present invention provides a reusable, guidelined alignment device and a method for using such a device to align and apply a group adhesively backed individual labels onto an object. The alignment device comprises a backing card that has a pressure sensitive adhesive portion selectively applied on one side. A release coated transparent strip is positioned on the backing card to overlie the adhesive portion in a releasably adherent condition. The backing card may advantageously include two more such adhesive portions and transfer strips. To align a group of the labels by using the present invention, the labels that are desired to be used to make up a legend are removed from their respective storage cards and are positioned on the transfer strip in such fashion that they are in line with one of the guidelines with their upper portions overlapping the edge of the transfer strip. The transfer strip with the labels attached thereto is then removed from the backing card and is juxtaposed with the object to be labeled, whereupon the upper portions of the labels are pressed against and adhered to the object in their prepositioned relationship. Thereafter the transfer strip is peeled away from the remaining portions of the labels and these remaining portions are also pressed against the object to be labeled.

The primary objects of this invention are to provide a means and method for the alignment and application of individual labels; to provide an alignment device that may be reused numerous times; to provide an alignment device that may be employed for the alignment and application of all sizes of labels; and to provide an alignment device that eliminates the need for the marking of guidelines on an object to be labeled. A more limited object is to provide the particular structures and methods hereinafter claimed.

BRIEF DESCRIPTION OF THE DRAWINGS

FIG. 1 is a front elevation view of an embodiment of an alignment device of the present invention showing two transfer strips adhering to a guidelined backing card, with portions cut away to expose adhesive layers laminated on the backing card;

FIG. 2 is a sectional view of the alignment device of FIG. 1;

FIGS. 3–7 illustrate sequentially the preferred method for the alignment of a group of adhesively backed labels by employing the alignment device of FIG. 1, in which:

FIG. 3 illustrates the prepositioning of a legend composed of a number of labels on one of the transfer strips of the alignment device of FIG. 1, FIG. 4 illustrates the removal of the transfer strip and its adhesively affixed labels of FIG. 3 from the backing card, FIG. 4a illustrates the transfer strip and is adhesively affixed labels fully removed from the backing card to more clearly show that only the bottom portions of the labels are affixed to the transfer strip, FIG. 5 illustrates the juxtaposition of the transfer strip and its affixed labels with an object to be labeled, FIG. 6 illustrates the manner in which the transfer strip is peeled away from the labels after the top portions of the labels have been pressed against the object to be labeled, FIG. 7 illustrates the labels aligned on and adhering to the object after the transfer strip has been completely removed; and FIG. 8 is a front elevation view of a second embodiment of the present invention showing a backing card and two guidelined transfer strips adhesively affixed thereto, with portions broken away.

DESCRIPTION OF THE PREFERRED EMBODIMENTS

FIGS. 1 and 2 illustrate a first embodiment of the present invention comprising an opaque backing card 1 and two transparent transfer strips 2 that are releasably adhered to the backing card 1. FIG. 1 indicates the manner in which the transfer strips 2 are affixed on the backing card 1 with their top and bottom edges 3 generally parallel to grid guidelines 4 marked on the backing card 1. The guidelines 4 instead of forming a grid, could as well be a plurality of parallel lines or other type of guidelines suitable to the desired alignment style. There are two generally rectangular upper and lower adhesive layers 5 applied to the front of the backing card; the upper adhesive layer 5 is positioned near the margin of the top edge 6 of the backing card 1 and the lower adhesive layer 5 is positioned near the margin of the bottom card edge 7. The transfer strips 2 are somewhat larger in size than the adhesive layers 5 and are normally placed on the backing card 1 in such a manner that they completely overlie the layers 5. The backing card 1 and the transfer strips 2 are substantially of the same thickness and they are readily bendable.

The transfer strips 2 are formed preferably a transparent plastic material such as polyester film or heavy gauge polyethylene that can be severely bent or twisted without any significant damage to them. The backing card 1, on the other hand, may be of somewhat stiffer material.

Formed laterally in the left end of the backing card 1 as viewed from the front are a plurality of relatively small rectangular perforations 8 utilized in conjunction with a binder (not shown) for binding the backing card 1 in a packet or booklet that may include several storage cards (also not shown) on which are affixed a large variety of adhesively backed labels such as those typified by the labels 9 shown in FIG. 3. The present invention, however, can be used with other styles of labels, and need not have perforations for joining the backing card into a booklet or packet.

A particularly useful method for employing the above described alignment device will now be described. First, the labels 9 (each having a layer of pressure sensitive adhesive) that are needed to form the desired legend are removed from their respective storage cards and by means of their adhesive backing are affixed to one of the transfer strips 2 in proper alignment to one another using the guidelines 4 printed on the backing card 1. The labels 9 are placed on the transfer strip 2 in such fashion that their bottom portions are affixed to the strip 2 and their upper portions extend beyond the top edge 3 of the strip. When the labels 9 are disposed on the transfer strip 2 in this manner their upper portions may or may not adhere to the backing card 1. If the upper portions of the labels 9 do become affixed to the backing card 1, there is little affinity between the card 1 and the labels 9 because the card 1 is release coated or made of a material which has releasable characteristics with respect to the adhesive on the labels. The transparency of the transfer strip 2 and the adhesive layer 5 enables the guidelines 4 on the backing card 1 to be seen and the labels 9 are properly aligned and accurately spaced apart on the transfer strip 2 by positioning them relative to the appropriate guidelines 4.

When the labels 9 are properly prepositioned on the transfer strip 2, the next step in the application process is to apply the labels 9 to an object 10 as shown in FIG. 5. To accomplish this, the transfer strip 2 is removed from the backing card 1. Since the strip 2 is larger than the adhesive layer 5 that holds the strip to the card 1, at least one strip end is not affixed to the card 1. This free end allows the user to grasp the transfer strip 2 and peel it away from the card 1 as shown in FIG. 4. In addition, a lateral score line 10' may be formed near an end of the backing card, which score line may be formed ⅛ inch to ⅜ inch in from the end of the backing card so as to lie underneath the transfer strip 2. The card can then be readily bent at the score line 10' to expose the free end of the strip 2. The transfer strip 2 may be release coated so that it can be easily removed from the backing card 1 without delamination of the adhesive layer 5 from the card, or transfer of the adhesive to the transfer strip. When the transfer strip 2 is separated from the card 1, the attached labels 9 adhere to the strip in their aligned positions are shown in FIG. 4a.

The transfer strip 2 with its affixed labels 9 is thereafter juxtaposed with the object 10 which is to be labeled. As shown in FIG. 5, the upper portions of the labels 9 extending beyond the edge of the transfer strip 2 are pressed against and adhered to the object 10. The transfer strip 2 is then removed from the lower portions of the labels 9. Due to the release coating or natural release characteristics of the transfer strip 2 the labels 9 have a greater affinity for the object 10 than they have for the strip 2. Thus, the strip 2 is easily peeled away from the lower portion of the labels 9 without destroying their alignment. FIG. 6 illustrates this peeling process and also the flexibility of the transfer strip 2 which facilitates the removal of the strip 2 from the labels 9. Application of the aligned labels 9 onto the object 10 is completed by pressing the lower portion of the labels 9 against the object 10 after they are separated from the transfer strip 2 and they will be in proper alignment with one another since their upper portions remain affixed to the object 10 while their lower portions are being separated from the strip. FIG. 7 shows the labels 9 aligned and spaced on the object 10 as desired.

Referring back to FIG. 5, to insure that the transfer strip 2 is correctly juxtaposed with the object 10 in order that the affixed labels 9 are aligned with the object 10 at the desired pitch, a pair of guide marks 11 may be drawn on the object 10. These guide marks 11 are positioned in such fashion that the ends of the transfer strip 2 may be aligned with them. The use of the guide marks 11 in conjunction wtih the transparent transfer strip 2 eliminates the need to mark a complete guideline on the surface of the object 10, hence, there is no guideline to be removed once the labels 9 are affixed to the object 10. However, in many instances, no such guide marks need to be drawn on the object 10 since the transfer strip 2 itself provides a member which can be used to obtain the desired positioning of the labels 9 on the object.

A second embodiment of the present invention, shown in FIG. 8, increases the simplicity with which the transfer strip 2 may be aligned on the surface of the object 10. The second embodiment is comprised of a backing card 12 with a pair of adhesive layers 13 and two transparent transfer strips 14. All of these elements are similar to those of the first embodiment except that grid guidelines 15 are marked on the transfer strips 14 instead of the backing card 12. By guidelining the transfer strips 14 several advantages are realized. First, when the transfer strips 14 are positioned on the backing card 12 in readiness for labels to be aligned on them, it is not critical that the transfer strips 14 be positioned in any particular manner on the backing card 12 so long as they are secured to the card 12 by the adhesive layers 13 of the card, whereas in the first embodiment the edges of the transfer strip had to be in a parallel relationship with the guidelines on the backing card. A second advantage of the embodiment of FIG. 8 is that when one of the guidelined transfer strips 14 is removed from the backing card 12 to be juxtaposed with an object, the guidelines 15 can be used to align the transfer strips 14 on the surface of the object to be labeled.

Both embodiments of the present invention may be reused many times and can be used with various sizes of labels. At the same time, the alignment device of the present invention is relatively inexpensive to manufacture and easy to utilize.

CONCLUSION

The present invention as thusly described provides a device and a method for the application of an aligned group of labels onto an object. The device of this invention includes a backing card, a transparent transfer strip releasably adhered thereto, and guidelines formed in one of these elements to be utilized for alignment of labels on the transfer strip. The term releasably adhered as used herein refers to the fact that the transfer strip is adhered to the backing card but can be separated from the backing card without delamination of the adhesive or transfer of adhesive from one element to the other; in an appropriate instance, the adhesive layer is generally on the backing card, but the adhesive layer can also be applied to the back of the transfer strip. The guidelines to be formed on the backing card or the transfer strip may comprise a group of intersecting horizontal and vertical lines, a group of vertical or horizontal lines only, diagonal lines where it may be desired to apply a legend in an inclined position, or curved lines if it is desired to form a legend in an arcuate relationship. The guidelines may also include a combination of one or more of the foregoing types of lines. In its preferred form, a pair of such transfer strips may be carried on a single backing card; however, one such transfer strip can be employed or more than two may be used if so desired.

A useful method for applying labels to an object through the use of a transfer strip as herein described involves aligning the labels on the transfer strip with a first portion of the labels adhered to the strip and a second portion extending beyond the edge thereof, adhesively adhering the second portion of each label to an object, then peeling away the transfer strip from the first portion of each label and adhering such remaining part of the labels to the object. Depending upon the nature of the labels and the nature of the transfer strip, it is possible to apply each label entirely onto the transfer strip, then bending the transfer strip so as to expose an upper portion of each label for adhering to the object, and thereafter peeling the transfer strip away from the balance of each label and adhering the balance of each label to the object. The procedure may be modified through the use of a transfer strip with a hinge line that would readily allow the hinged segment of the transfer strip to be bent away from the labels to expose a portion of them for adhering to the object.

This invention has been described with reference to several presently preferred embodiments; however, it is expected that those skilled in the art will be able to devise changes to the illustrated embodiments and other embodiments which will be within the spirit and scope of the present invention.

We claim:

1. A device for the alignment and transfer of individual labels coated on one side with pressure sensitive adhesive comprising, in combination:

a backing card, a transparent transfer strip releasably adhered to the backing card, and a plurality of guidelines formed on one of said elements and arranged for alignment of labels applied to the transparent transfer strip, said transparent strip being smaller than the backing card to provide for temporary positioning of a label onto the device with a portion of the label arranged on the transfer strip and the remainder of the labels arranged on the backing card, said transfer strip being releasable from the backing card for removal therefrom and for transport of labels arranged on the transfer strip in alignment with the guidelines to an object to be labeled.

2. The combination of claim 1 wherein the guidelines are formed on the backing card.

3. The combination of claim 1 wherein the guidelines are formed on the transfer strip.

4. The combination of claim 1 wherein the backing card has an adhesive layer, and the transfer strip is releasably adhered to the adhesive layer.

5. The combination of claim 1 wherein a score line is formed in the backing card underneath the transfer strip near an end thereof.

6. The combination of claim 4 wherein the adhesive layer is smaller than the transfer strip and at least one end of the transfer strip extends beyond the adhesive layer to provide a free end thereof for removal of the transfer strip from the adhesive layer.

7. The combination of claim 4 wherein a score line is formed in the backing card underneath the transfer strip near an end thereof.

References Cited
UNITED STATES PATENTS

| | | | |
|---|---|---|---|
| 3,687,750 | 8/1972 | Jamieson | 156—63 |
| 3,690,909 | 9/1972 | Finley | 156—230 |
| 2,679,928 | 6/1954 | Bishop et al. | 156—249 |
| 3,676,248 | 7/1972 | Swartz | 156—240 |
| 741,746 | 10/1903 | Walker | 156—299 |
| 3,315,387 | 4/1967 | Heuser | 40—125 |

ALFRED L. LEAVITT, Primary Examiner

J. MASSIE, Assistant Examiner

U.S. Cl. X.R.

161—406; 156—230; 40—125

UNITED STATES PATENT OFFICE
CERTIFICATE OF CORRECTION

Patent No. 3,761,344   Dated October 4, 1973

Inventor(s) Elliott G. Heuser and James M. Mrozek

It is certified that error appears in the above-identified patent and that said Letters Patent are hereby corrected as shown below:

Column 1, line 24 after "means" insert --and method for the alignment--;

Column 1, lines 65 and 66 "configuratino" should be --configuration--;

Column 1, line 72, after "group" insert --of--.

Column 2, line 6, after "two" insert --or--.

Column 3, line 20, after "formed" insert --from--.

Column 4, line 3, "are" should be --as--.

Column 6, line 6 (claim 1), after "transparent" insert --transfer--; and at line 9, "labels" should be --label--.

Signed and sealed this 1st day of January 1974.

(SEAL)
Attest:

EDWARD M. FLETCHER, JR.　　　　　RENE D. TEGTMEYER
Attesting Officer　　　　　　　　Acting Commissioner of Patents